US008018940B2

(12) United States Patent
Hao et al.

(10) Patent No.: US 8,018,940 B2
(45) Date of Patent: *Sep. 13, 2011

(54) NETWORK ADDRESS LOOKUP BASED ON BLOOM FILTERS

(75) Inventors: Fang Hao, Morganville, NJ (US);
Muralidharan S. Kodialam, Marlboro, NJ (US); Tirunell V. Lakshman, Morganville, NJ (US); Haoyu Song, Edison, NJ (US)

(73) Assignee: Alcatel Lucent, Paris (FR)

( * ) Notice: Subject to any disclaimer, the term of this patent is extended or adjusted under 35 U.S.C. 154(b) by 410 days.

This patent is subject to a terminal disclaimer.

(21) Appl. No.: 12/190,633

(22) Filed: Aug. 13, 2008

(65) Prior Publication Data

US 2010/0040066 A1  Feb. 18, 2010

(51) Int. Cl.
*H04L 12/56* (2006.01)
(52) U.S. Cl. .................................. 370/392; 370/395.32
(58) Field of Classification Search ........................ None
See application file for complete search history.

(56) References Cited

U.S. PATENT DOCUMENTS

| | | | |
|---|---|---|---|
| 6,473,424 B1 | 10/2002 | DeJager et al. | |
| 7,126,948 B2 | 10/2006 | Gooch et al. | |
| 7,289,979 B2* | 10/2007 | Wilson | 370/392 |
| 7,444,515 B2* | 10/2008 | Dharmapurikar et al. | 713/176 |
| 7,636,703 B2* | 12/2009 | Taylor | 706/62 |
| 7,839,891 B1* | 11/2010 | Allan | 370/469 |
| 7,865,608 B1* | 1/2011 | Schuba et al. | 709/231 |
| 2003/0026268 A1* | 2/2003 | Navas | 370/389 |
| 2003/0169745 A1 | 9/2003 | Gooch | |
| 2003/0174710 A1 | 9/2003 | Gooch | |
| 2005/0086520 A1 | 4/2005 | Dharmapurikar et al. | |
| 2005/0174272 A1* | 8/2005 | Cadambi et al. | 341/106 |
| 2005/0175010 A1* | 8/2005 | Wilson et al. | 370/392 |
| 2005/0195832 A1* | 9/2005 | Dharmapurikar et al. | 370/389 |
| 2005/0198379 A1 | 9/2005 | Panasyuk et al. | |
| 2005/0223102 A1* | 10/2005 | Zhang et al. | 709/228 |
| 2005/0249214 A1* | 11/2005 | Peng | 370/392 |
| 2006/0184690 A1* | 8/2006 | Milliken | 709/238 |
| 2007/0115986 A1* | 5/2007 | Shankara | 370/392 |

(Continued)

OTHER PUBLICATIONS

Haoyu Song; Fang Hao; Kodialam, M.; Lakshman, T.V.; , "IPv6 Lookups using Distributed and Load Balanced Bloom Filters for 100Gbps Core Router Line Cards," Apr. 19-25, 2009, INFOCOM 2009, IEEE , pp. 2518-2526.*

(Continued)

*Primary Examiner* — Ayaz R Sheikh
*Assistant Examiner* — Timothy J Weidner
(74) *Attorney, Agent, or Firm* — Mendelsohn, Drucker & Associates, P.C.; Steve Mendelsohn

(57) ABSTRACT

In one embodiment, IP lookup into a routing table having prefixes of different prefix lengths is performed using a Bloom filter that was programmed with the prefixes corresponding to all of the different prefix lengths without having to expand any of the prefixes programmed into the Bloom filter. Membership probes are performed into the Bloom filter using candidate prefix values of a given network address. The Bloom filter can be implemented in a distributed manner using Bloom sub-filters, where each Bloom sub-filter is hashed based on a set of hash functions, where each different hash function in the set corresponds to a different prefix length in the routing table. Each Bloom sub-filter can in turn be implemented using a plurality of practically realizable multi-port memory devices controlled by a port scheduler. False-positive matches can be detected and next-hop information for true-positive matches retrieved using an off-chip, hash-based prefix table.

34 Claims, 6 Drawing Sheets

U.S. PATENT DOCUMENTS

| | | | |
|---|---|---|---|
| 2007/0136331 A1* | 6/2007 | Hasan et al. | 707/100 |
| 2007/0248084 A1* | 10/2007 | Whitehead | 370/389 |
| 2007/0294506 A1 | 12/2007 | Ross | |
| 2008/0111718 A1* | 5/2008 | Lin et al. | 341/51 |
| 2009/0030895 A1 | 1/2009 | Eswaran et al. | |
| 2009/0046581 A1 | 2/2009 | Eswaran et al. | |
| 2010/0023727 A1* | 1/2010 | Lim | 711/216 |
| 2010/0098081 A1* | 4/2010 | Dharmapurikar et al. | 370/392 |
| 2010/0284405 A1* | 11/2010 | Lim | 370/392 |

OTHER PUBLICATIONS

B. Bloom, "Space/Time Trade-offs in Hash Coding With Allowable Errors," Communications of the ACM, vol. 13, No. 7, Jul. 1970, pp. 422-426.

H. Song, S. Dharmapurikar, J. S. Turner, and J. W. Lockwood, "Fast Hash Table Lookup using Extended Bloom Filter: An Aid to Network Processing," ACM SIGCOMM, 2005, 12 pages.

S. Kumar, J. Turner, and P. Crowley, "Peacock Hashing: Deterministic and Updatable Hashing for High Performance Networking," IEEE INFOCOM, Jan. 2008, pp. 556-564.

A. Broder and M. Mitzenmacher, "Using Multiple Hash Functions to Improve IP Lookups," IEEE INFCOM, 2001, pp. 1-11.

M. Ramakrishna, E. Fu, and E. Behcekapili, "A Performance Study of Hashing Functions for Hardware Applications," Proc. $6^{th}$ Int'l. Conf. Computing and Information, 1994, pp. 1621-1636.

"Longest Prefix Matching Using Bloom Filters," by Sarang Dharmapurikar et al., SIGCOMM'03, Aug. 25-29, 2003, 12 pages.

* cited by examiner

US 8,018,940 B2

NETWORK ADDRESS LOOKUP BASED ON BLOOM FILTERS

CROSS-REFERENCE TO RELATED APPLICATIONS

The subject matter of this application is related to U.S. patent application Ser. No. 12/190,684, filed the same date as this application, the teachings of which are incorporated herein by reference in its entirety.

BACKGROUND OF THE INVENTION

1. Field of the Invention

The invention relates to network communication routing and, in particular, to performing longest prefix matching for network address lookup using hash functions and Bloom filters.

2. Description of the Related Art

Internet core routers need to forward packets as fast as possible. Forwarding decisions on a data path are made through IP (Internet Protocol) lookup, also known as the Longest Prefix Matching (LPM). A prefix lookup table (LUT) includes prefixes of different lengths. Each prefix value in the prefix LUT is associated with an output interface connecting to the next hop along the data path. To forward a packet, a router processor uses the destination IP address contained in the packet header to search against the prefix LUT and then extract the associated output interface corresponding to the longest matching prefix.

As the central function of an Internet router, IP lookup often poses as the performance bottleneck. The number of IPv4 prefixes in a core router prefix LUT has recently exceeded 250K, increasing at a rate of a few tens of thousand of prefixes each year. While the current IPv6 table is still relatively small, the foreseeable large-scale deployment of IPv6 will result in a table size no smaller than that of IPv4. Recently, 40 G line cards have been installed in high-end core routers such as Cisco's CRS-1 router and Juniper's T640 router, which support a packet forward rate of about 50 million packets per second (Mpps). Driven by media-rich Internet applications, IEEE has started to standardize the 100 Gigabit Ethernet (GbE) and planned to finish it in 2010, to partially fulfill the insatiable demands on more network bandwidth. Pre-standard 100 GbE products are expected to be available in the market in about the same time frame. Accordingly, the required packet lookup rate for 100 G line card will be further boosted to 150 Mpps. This more-than-two-times leap beyond 40 G creates a vast technical challenge that the currently adopted IP lookup solutions cannot address.

It is tempting to think of using TCAM (Ternary Content-Addressable Memory) devices for IP lookups. Indeed, with a remarkable rate of 250M+ searches per second, it seems not a big deal to support even the next-generation IP lookup demand. Unfortunately, even though cost is a secondary consideration for core routers, TCAMs are by no means popular in core routers in practice. The major reasons are their inherent high power dissipation and large footprint. In addition to these disadvantages, an incremental prefix update in TCAM involves as many memory operations as the number of unique prefix lengths.

It is always the theme of designing an efficient IP lookup algorithm to (1) achieve more compact storage and (2) sustain a faster lookup rate. Note that compact storage has an important implication: it potentially enables use of smaller yet faster memory components, such as SRAM devices or even on-chip embedded memory blocks, and, as a result, it also benefits the throughput performance.

As the throughput requirement of modern routers outpaces improvements in SRAM speed, people started to think about using on-chip memory as cache to facilitate faster IP lookups. Thanks to technology advancements, we can now embed a few tens of megabits of fast memory on a chip. This scarce resource has proven to be very critical to satisfy the throughput requirements of the next-generation network applications.

U.S. Patent Application Publication No. US 2005/0195832 A1 ("the '832 publication"), the teachings of which are incorporated herein by reference in its entirety, discloses an IP lookup algorithm that relies on the use of Bloom filters. Bloom filters allow the use of fast on-chip memory and take advantage of the massive parallel processing power of hardware. This Bloom-filter-based IP lookup algorithm, which is described in more detail later in this specification, is relatively simple and promises a very good average performance. However, it also has some drawbacks preventing it from being used in real applications.

First, in the worst case when all the Bloom filters show false positive, the prefix table needs to be searched as many times as the number of Bloom filters. One way to improve the worst-case performance is to reduce the number of Bloom filters. This means prefixes with different lengths need to be "compressed" into a single Bloom filter by using a technique known as prefix expansion. The improvement on the worst-case performance comes at a cost of more memory consumption, because the size of the prefix table can be significantly expanded, even in a controlled fashion. In addition, prefix expansion makes the routing updates much more time-consuming and awkward, while incremental updates happen fairly frequently in core routers. Multiple expanded prefixes need to be taken care of when only a single original prefix is inserted or deleted. In short, the algorithm does not scale very well for larger tables and longer prefixes.

Second, the distribution of prefix lengths is highly asymmetric and dynamic with the incremental updates. To reduce the false positive rate and best utilize the scarce memory resources, the size of each Bloom filter as well as the number of hash functions need to be customized according to the number of prefixes that need to be programmed into the Bloom filter. The current prefix distribution also needs to be able to be adapted by adjusting the memory allocation dynamically. Engineering such a system is difficult and expensive. It requires either over-provisioning or the capability of reconfiguration. We can easily rule out the over-provisioning option, because fast on-chip memory is still a scarce and costly resource. Theoretically, reconfiguration can be done in field-programmable gate arrays (FPGAs); however, in practice, it takes seconds to finish and can interrupt router services. In fixed application-specific integrated circuit (ASIC) devices, reconfiguration is simply impossible.

Third, in order to achieve a desired goal of one cycle per lookup, the '832 publication assumes that a Bloom filter is implemented in a k-port memory, where k equals to the number of hash functions. This is impractical in real hardware implementations for even modest values of k (e.g., greater than two).

SUMMARY OF THE INVENTION

In one embodiment, the invention is a method for performing a network address lookup for a routing table having prefixes of a plurality of different prefix lengths. The method comprises (a) providing a Bloom filter programmed with the prefixes corresponding to all of the different prefix lengths in the routing table without having to expand any of the prefixes programmed into the Bloom filter and (b) performing membership probes into the Bloom filter using candidate prefix values for a given network address.

In another embodiment, the invention is an apparatus for performing a network address lookup for a routing table having prefixes of a plurality of different prefix lengths. The apparatus comprises a Bloom filter and a routing processor. The Bloom filter is adapted to be programmed with the prefixes corresponding to all of the different prefix lengths in the routing table without having to expand any of the prefixes programmed into the Bloom filter. The routing processor is adapted to perform membership probes into the Bloom filter using candidate prefix values for a given network address.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Network Address Lookup Using Multiple Bloom Filters

Figure 1:
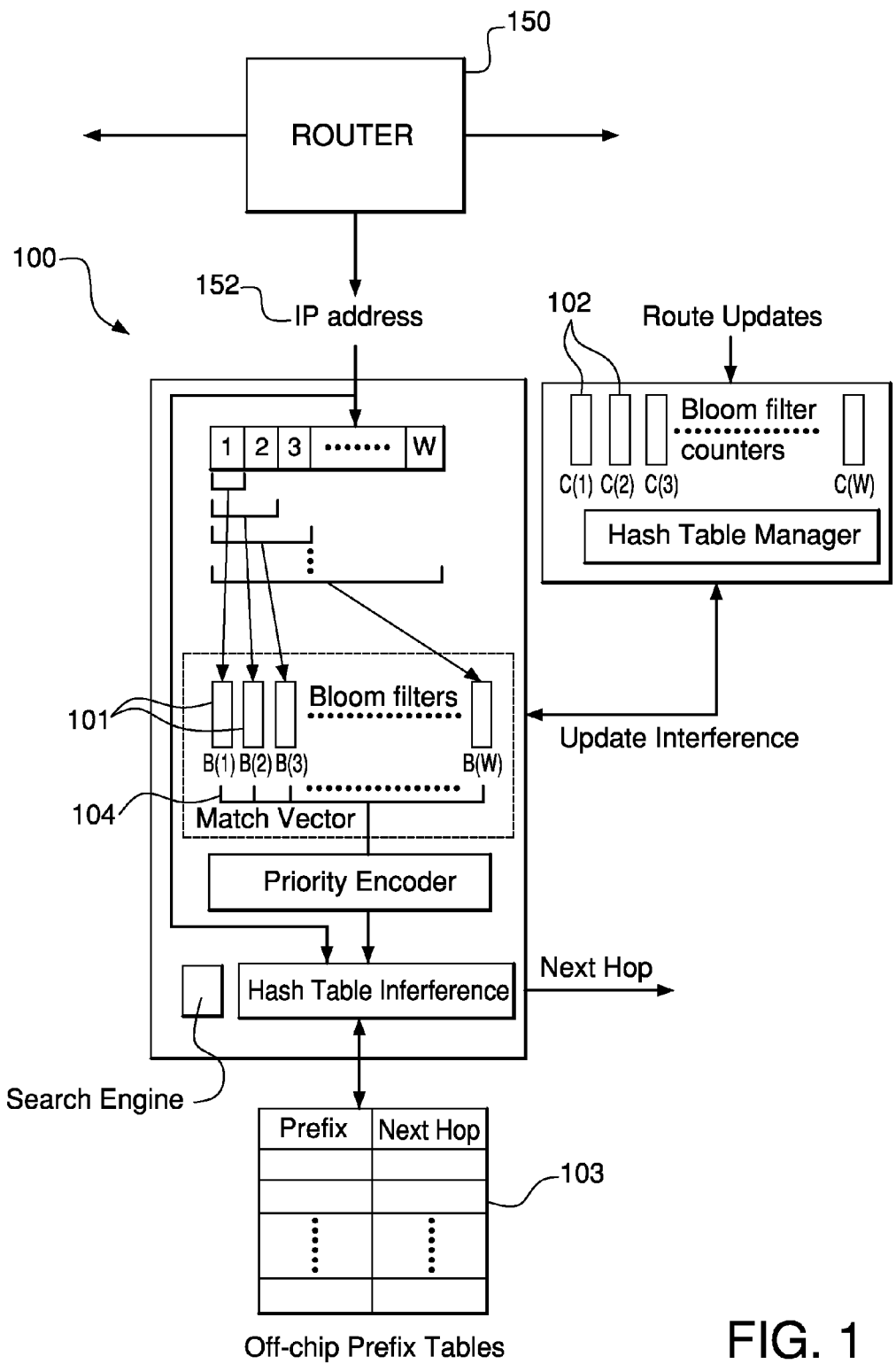
FIG. 1 shows a block diagram of the exemplary system disclosed in the '832 publication for performing a network address lookup using longest prefix matching that employs Bloom filters.

FIG. 1 shows a block diagram of exemplary system 100 disclosed in the '832 publication for performing a network address lookup using longest prefix matching that employs Bloom filters. System 100 is operatively connected to a router 150 to receive an IP address 152, such as a destination network address, from a packet payload (not shown) that is traversing through router 150. System 100 includes a group of on-chip Bloom filters 101 that are operatively configured to determine IP network address prefix memberships in sets of prefixes that are sorted by prefix length in a routing table (not shown). System 100 also includes a group of counting Bloom filters 102 and an off-chip prefix table 103. Each counting Bloom filter 102 is operatively connected to update, as necessary, the programming of a respective Bloom filter 101 as prefixes are added to or deleted from the set of prefixes represented in the routing table. Off-chip prefix table 103 is also operatively connected to Bloom filters 101 and stores a representation of the routing table.

A network address lookup search executed by system 100 begins by performing parallel membership queries to Bloom filters 101, which are organized by prefix length. The result is a match vector 104 indicating matching prefix lengths, some of which may be false positive matches. Prefix table 103 has all the prefixes in the routing table and is operatively configured to be probed in order of the longest match in match vector 104 to the shortest match in match vector 104, terminating when either a match is found in prefix table 103 or all of the matches represented in the match vector have been searched.

Figure 2:
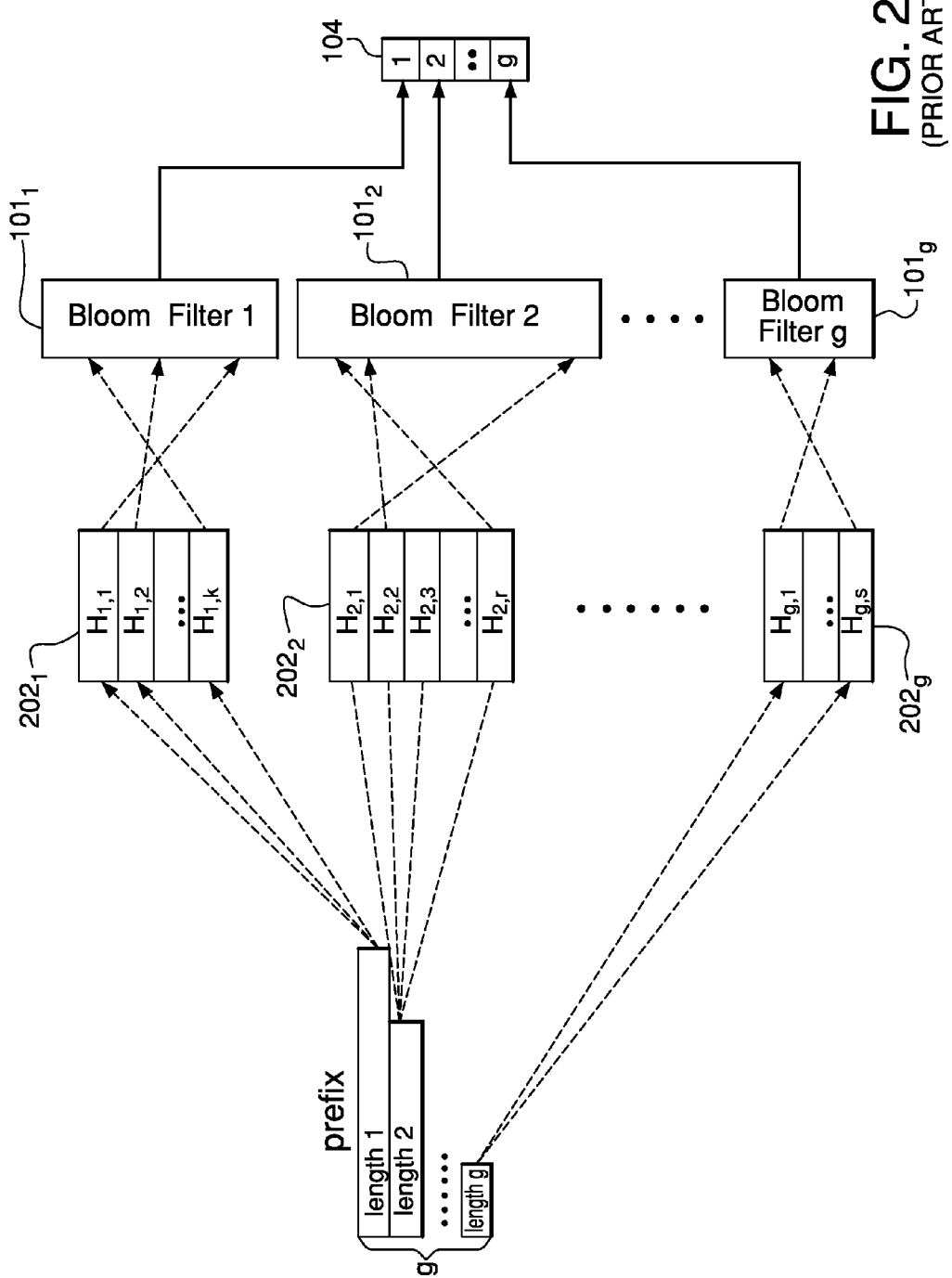
FIG. 2 shows a block diagram of the architecture of the Bloom filters of the system of FIG. 1 for a routing table having g different prefix lengths.

FIG. 2 shows a block diagram of the architecture of Bloom filters 101 of system 100 of FIG. 1 for a routing table having g different prefix lengths. As shown in FIG. 2, for each different prefix length i, $1 \leq i \leq g$, there is a set $202_i$ of hash functions $H_{i,j}$ associated with a different Bloom filter $101_i$, where each Bloom filter $101_i$ is associated with the ith bit in the g-bit match vector 104. Each prefix length i is typically associated with a different number of hash functions. In the example of FIG. 2, the first set $202_1$ has k hash functions $H_{1,j}$, $1 \leq j \leq k$; the second set $202_2$ has r hash functions $H_{2,j}$, $1 \leq j \leq r$; and the gth set $202_g$ has s hash functions $H_{g,j}$, $1 \leq j \leq s$. In this specification, the parameter H is used interchangeably to refer to hash functions as well as to particular hash values generated by applying those hash functions to particular prefix values.

In general, a Bloom filter can store a "signature" of an item using relatively few bits, regardless of the size of the item itself. The theory of the Bloom filter is presented in B. Bloom, "Space/Time Trade-offs in Hash Coding With Allowable Errors," *Communications of the ACM*, July 1970, the teachings of which are incorporated herein by reference in its entirety. Given n items and an m-bit array, each item sets k bits in the bit array through k independent hashings. Due to hash collisions, a bit can be set by multiple items. When querying the membership of an item, the item is first hashed using the same set of hash functions and then the k bits to which the hash values point are examined. If any bit is zero, then one can positively determine that the item is not a member. If all k bits are one, then the item can be claimed to be a member with a non-zero false-positive probability. The false-positive probability $p_f$ is a function of m, n, and k as shown in Equation (1) as follows:

$$p_f = (1-e^{-kn/m})^k. \quad (1)$$

While a Bloom filter is relatively compact, such that it can usually fit into a small on-chip cache, we should not blindly assume that it is also very fast. For real-time network packet processing, only one or a few clock cycles are often available for a packet to search a Bloom filter. We need to consider three issues to ensure that the use of Bloom filters is viable.

First, in order to minimize the false-positive probability, the number k of hash functions needed by a Bloom filter can be large (specifically, $k = \ln 2 \times m/n$ is the optimal value). If a Bloom filter is implemented using a single-port memory block, then it takes as many accesses as the number of hash functions to finish one Bloom filter lookup, making the achievable throughput far below the desired one. To resolve this issue, one can use multi-port memories to implement the Bloom filter so that multiple accesses can be applied to the Bloom filter simultaneously. An N-port memory leads to N× speedup relative to a single-port memory. The down side is that the multiple ports increase the pin count, the power consumption, and the footprint of the memory module. Therefore, for practical implementations, N cannot be large. Although memory with three or more ports is possible, two-port memory is still the most practical option, steadily available in most ASICs and FPGAs.

Second, a good universal hash function is usually computationally intensive. Slow hash function calculation is another source to lower system throughput. For a hardware implementation, the hash function calculation either should be suitable for a pipeline implementation or can finish in just one clock cycle with relatively little logic resource consumption. A pipeline implies a longer latency which is sometimes undesirable. On the other hand, it is challenging to find good and independent hash functions that are both fast and compact, especially when many of them need to be implemented in parallel.

Third, a Bloom filter can give a false positive answer to the membership query. Moreover, it cannot provide the associated information of a matching item by itself. In IP lookup, an extra lookup step needs to be conducted to verify the match and retrieve the associated information. This step can become the performance bottleneck that cancels the gain from the front-end Bloom filter.

Referring again to FIG. 2, Bloom filters 101, whose bits are initialized to all zeros, are "programmed" for a given routing table by hashing each different prefix value in the routing table using the corresponding set of hash functions. In general, a prefix value of length i is hashed using the different hash functions $H_{i,j}$ in the corresponding set $202_i$. Each hash function $H_{i,j}$ hashes the prefix value into a value corresponding to an address in the corresponding Bloom filter $101i$. In general, each hash function $H_{i,j}$ hashes different prefix values of the same length i into either the same or different Bloom filter address values. In addition, it is possible for different hash functions $H_{i,j}$ to hash different prefix values—or even the same prefix value—into the same Bloom filter address value.

During Bloom filter programming, when a hash function $H_{i,j}$ hashes a prefix value into a particular Bloom filter address value, the Bloom filter bit corresponding to that address value is set to one. After all of the prefix values of the g different prefix lengths in the routing table have been hashed by their corresponding sets of Hash functions, some, but not all, of the bits in each Bloom filter 101 will be set to one.

After Bloom filters 101 have been programmed for a given routing table, to determine whether a particular candidate prefix value of length i is represented in the routing table, the candidate prefix value is hashed using the corresponding set $202_i$ of hash functions to generate a corresponding number of Bloom filter address values. If any one of those Bloom filter address values corresponds to a zero-bit in Bloom filter $101_i$, then the candidate prefix value is not represented in the routing table, and the ith bit of match vector 104 is set to zero. If all of the Bloom filter address values correspond to one-bits in Bloom filter $101_i$, then the candidate prefix value may be represented in the routing table, and the ith bit of match vector 104 is set to one.

Since each bit in a Bloom filter 101 may be set by different hashings of prefix values, it is possible for a given candidate prefix value that is not represented in a routing table nevertheless to hash to a set of Bloom filter address values corresponding to Bloom filter bits that are all ones. This is referred to as a false positive.

Furthermore, the goal of IP lookup is to find, for a given destination IP address, the longest prefix value that is represented in a given routing table. It is possible that two or more candidate prefix values of different lengths corresponding to a single destination IP address will each hash to Bloom filter address values corresponding to all ones in the corresponding Bloom filter 101. This means that, for a given destination IP address, two or more different bits in match vector 104 may be set to one, and one or more of the candidate prefix values corresponding to those one-bits in match vector 104 may actually correspond to false positives that are not represented in the routing table.

To determine whether a one-bit in match vector 104 corresponds to a false positive and to enable identification of the output interface connecting to the next hop along the data path, system 100 of FIG. 1 includes off-chip prefix table 103, where each entry in prefix table 103 includes a different prefix value in the routing table and an identification of its corresponding next-hop output interface. In general, for each one-bit in match vector 104, system 100 hashes the corresponding candidate prefix value into an address into prefix table 103 using a special prefix-table-address hash function (typically different from the hash functions associated with the Bloom filters).

If the prefix-table prefix value stored at that address does not match the candidate prefix value, then the candidate prefix value is not represented in the routing table, and the corresponding one-bit in match vector 104 indicates a false positive. If, on the other hand, the prefix-table prefix value stored at that address does match the candidate prefix value, then the candidate prefix value is represented in the routing table, and the corresponding one-bit in match vector 104 indicates a true positive.

Since the goal is to find the longest matching prefix in the routing table, when match vector 104 has more than one one-bit, system 100 starts by considering the longest candidate prefix value corresponding to a one-bit in match vector 104. If that longest candidate prefix value hashes into a prefix-table address pointing to a prefix-table prefix value that does not match the longest candidate prefix value, then system 100 rejects that longest candidate prefix value as a false positive and proceeds to consider the next-longest candidate prefix value corresponding to a one-bit in match vector 104, and so on, until either (i) a true positive is found and the corresponding output interface in router 150 is successfully identified or (ii) all of the candidate prefix values corresponding to one-bits in match vector 104 are determined to be false positives.

By carefully designing system 100, for a modest amount of on-chip resources for Bloom filters 101, the expected number of off-chip memory accesses required by system 100 per network address lookup can approach one, providing better performance, scalability, and lower cost than TCAMs, given that commodity SRAM devices used for off-chip prefix table 103 are denser, cheaper, and operate more than three times faster than TCAM-based solutions. Unfortunately, system 100 also suffers from the drawbacks previously described in the Background of the Invention.

Network Address Lookup Using a Single Bloom Filter

Figure 3:
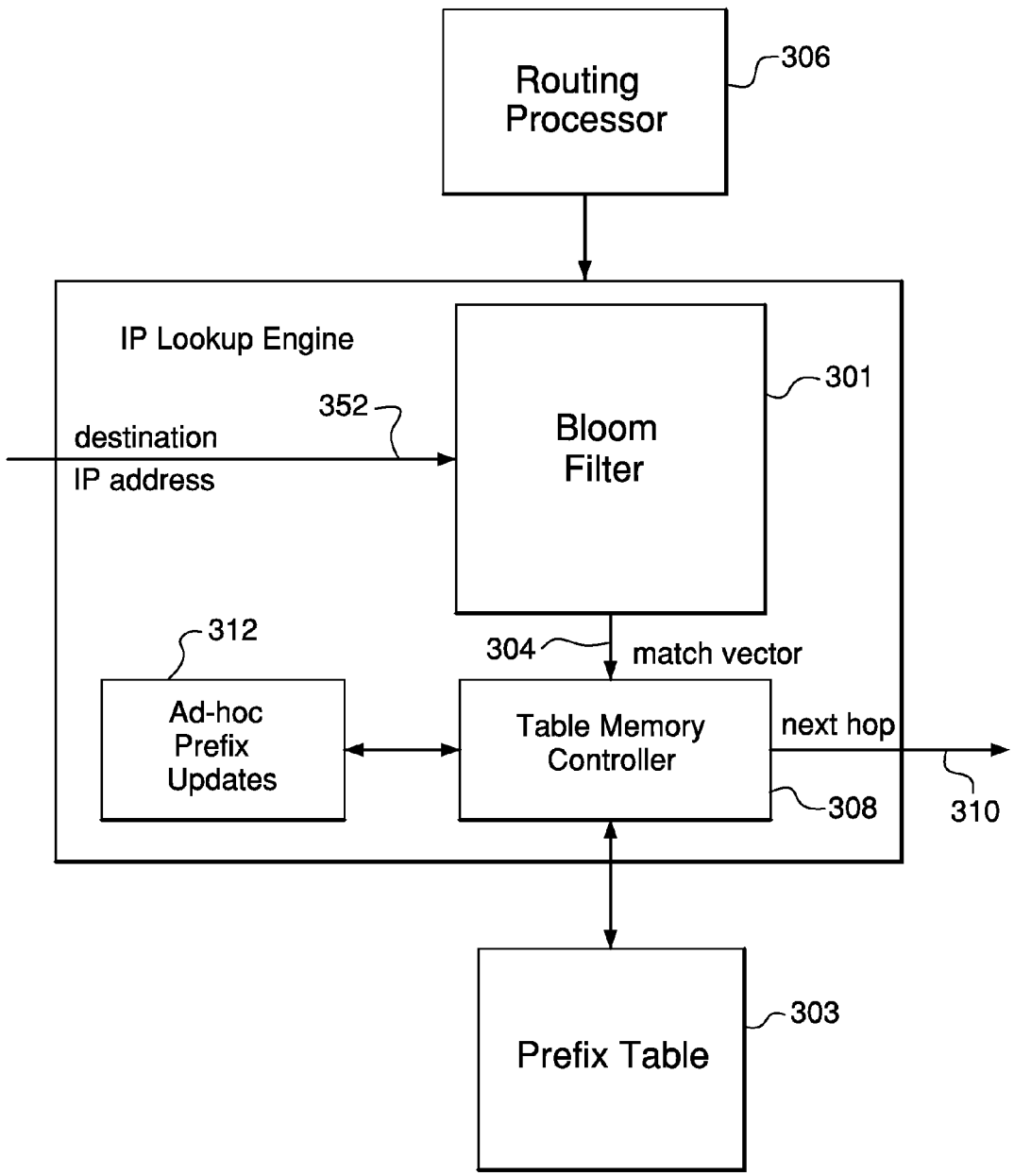
FIG. 3 shows a block diagram of a system for performing a network address lookup using longest prefix matching that employs a single Bloom filter, according to one embodiment of the present invention.

FIG. 3 shows a block diagram of system 300 for performing a network address lookup using longest prefix matching that employs a single Bloom filter 301, according to one embodiment of the present invention. System 300 is analogous to system 100 of FIG. 1, where:

Destination IP address 352 of FIG. 3 is analogous to destination IP address 152 of FIG. 1;
Bloom filter 301 of FIG. 3 is analogous to the set of multiple Bloom filters 101 of FIG. 1;
Match vector 304 of FIG. 3 is analogous to match vector 104 of FIG. 1; and
Prefix table 303 of FIG. 3 is analogous to off-chip prefix table 103 of FIG. 1.

Although not represented in FIG. 3, system 300 has, for example, a counting Bloom filter, analogous to counting Bloom filters 102 of FIG. 1, that performs any necessary updating of the programming of Bloom filter 301 as prefix values are added to and subtracted from the routing table.

In addition, system 300 includes:

Routing processor 306, which is responsible for updating prefix table 303 and configuring Bloom filter 301;

Table memory controller 308, which uses match vector 304 to search prefix table 303 in order to retrieve and output the next-hop information 310 (e.g., identification of the output interface corresponding to the longest matching prefix); and Ad-hoc prefix updates block 312, which, as described later in this specification, inserts a corresponding new expanded prefix value into prefix table 303 upon determination of a false positive.

Figure 4:
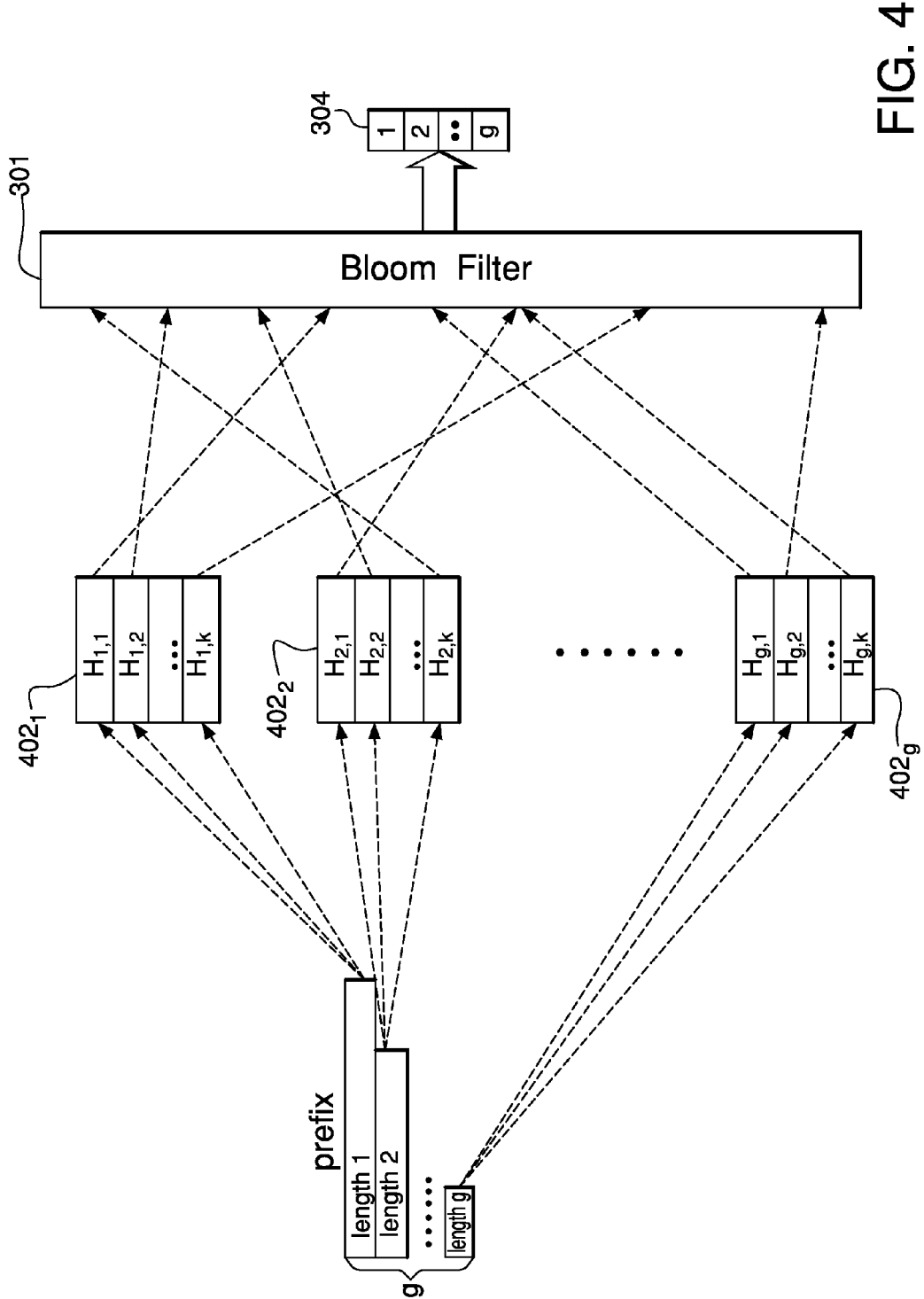
FIG. 4 shows a block diagram of one implementation of the architecture of the Bloom filter of FIG. 3, according to one embodiment of the present invention.

FIG. 4 shows a block diagram of one implementation of the architecture of Bloom filter 301 of FIG. 3, according to one embodiment of the present invention. Similar to the architecture of FIG. 2 for Bloom filters 101 of FIG. 1, the architecture of Bloom filter 301 corresponds to g different prefix lengths, where each different prefix length i, $1 \leq i \leq g$, is associated with a different set $402_i$ of hash functions $H_{i,j}$. However, unlike system 100 of FIG. 1, which has g different Bloom filters 101, one for each different prefix length, system 300 has only one Bloom filter 301, no matter how many different prefix lengths there are, where all of the different hash functions $H_{i,j}$ hash their corresponding prefix values into address values of that single Bloom filter 301.

Furthermore, unlike the architecture of FIG. 2, in which the different sets 202 of hash functions typically have different numbers of hash functions, in the architecture of FIG. 2, each set $402_i$ has the same number k of hash functions.

If, using the corresponding set $402_i$ of hash functions, a particular candidate prefix value of length i hashes to k Bloom filter address values corresponding to all one-bits in Bloom filter 301, then the ith bit of match vector 304 is set to one to indicate that the candidate prefix value of length i may be the longest matching prefix; otherwise, the ith bit of match vector 304 is set to zero indicating that the candidate prefix value of length i is not represented in the routing table.

In certain implementations of system 300 of FIG. 3, prefix table 303 may be similar to prefix table 103 of FIG. 1, and the processing of match vector 304 by table memory controller 308 may be similar to the processing of match vector 104 by system 100 of FIG. 1. In other possible implementations of system 300 described below, prefix table 303 is different, and the processing of match vector 104 is also different.

Figure 5:
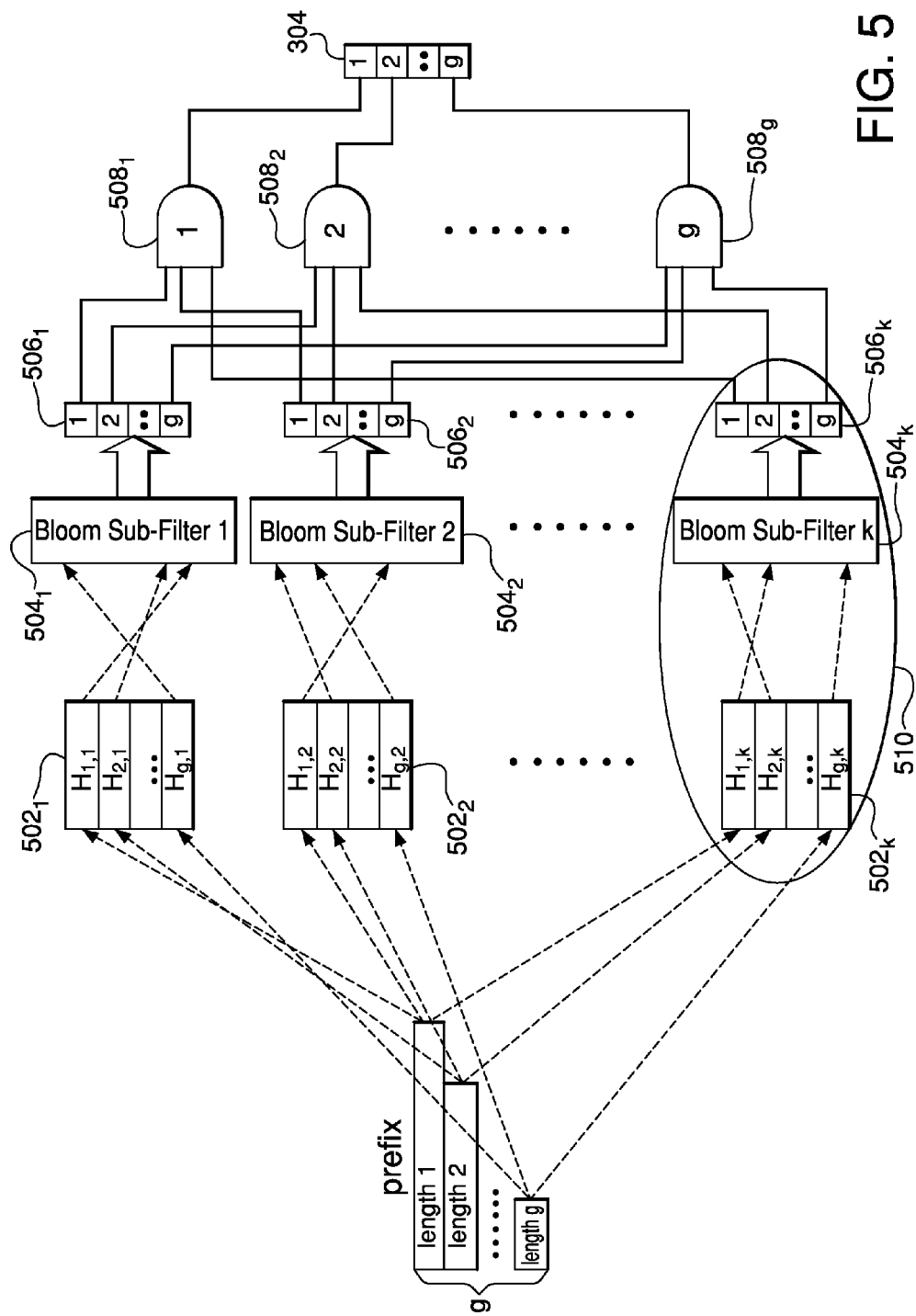
FIG. 5 shows a block diagram of a different implementation of the architecture of the Bloom filter of FIG. 3, according to another embodiment of the present invention.

FIG. 5 shows a block diagram of a different implementation of the architecture of Bloom filter 301 of FIG. 3, according to another embodiment of the present invention. As in FIG. 4, candidate prefix values of the same g prefix lengths get hashed to generate the same g-bit match vector 304. However, in FIG. 5, single Bloom filter 301 is implemented in a distributed manner using k different Bloom sub-filters 504, where each different Bloom sub-filter $504_j$ implements a different portion of Bloom filter 301. This distributed implementation enables Bloom filter 301 to be hashed into in parallel using multiple candidate prefixes values of different lengths corresponding to a single value of destination IP address 352.

Furthermore, instead of arranging the g×k different hash functions $H_{i,j}$ into g sets 402 of k hash functions each as in FIG. 4, in FIG. 5, the g×k different hash functions $H_{i,j}$ are arranged into k sets 502 of g hash functions each. As shown in FIG. 5, each different hash function $H_{i,j}$ in the jth set $502_j$ hashes a candidate prefix value of a different length i into an address in the corresponding Bloom sub-filter $504_j$.

Each different Bloom sub-filter $504_j$ is used to generate a different corresponding g-bit pre-match vector $506_j$, $1 \leq j \leq k$. A logical AND operation is applied to the ith bits of the k different pre-match vectors 506 by a corresponding k-input AND gate $508_i$ to form the ith bit of match vector 304.

To determine whether a particular candidate prefix value of length i is represented in the routing table, the candidate prefix value is hashed using the ith hash function $H_{i,j}$ in each of the k different sets 502 of hash functions to generate k different address values, one for each different Bloom sub-filter $504_j$. If all of those Bloom sub-filter address values point to one-bits in the k different Bloom sub-filters 504, then the ith bit in each of the k pre-match vectors 506 will be set to one, and the ith AND gate $508_i$ will output a one into the ith bit of match vector 304, indicating that the candidate prefix value might be represented in the routing table. If, on the other hand, even one of the k different Bloom sub-filter address values generated by hashing the candidate prefix value points to a zero-bit in the corresponding Bloom sub-filter 504, then the ith bit of match vector 304 will be set to zero, indicating that the candidate prefix value is not represented in the routing table.

Figure 6:
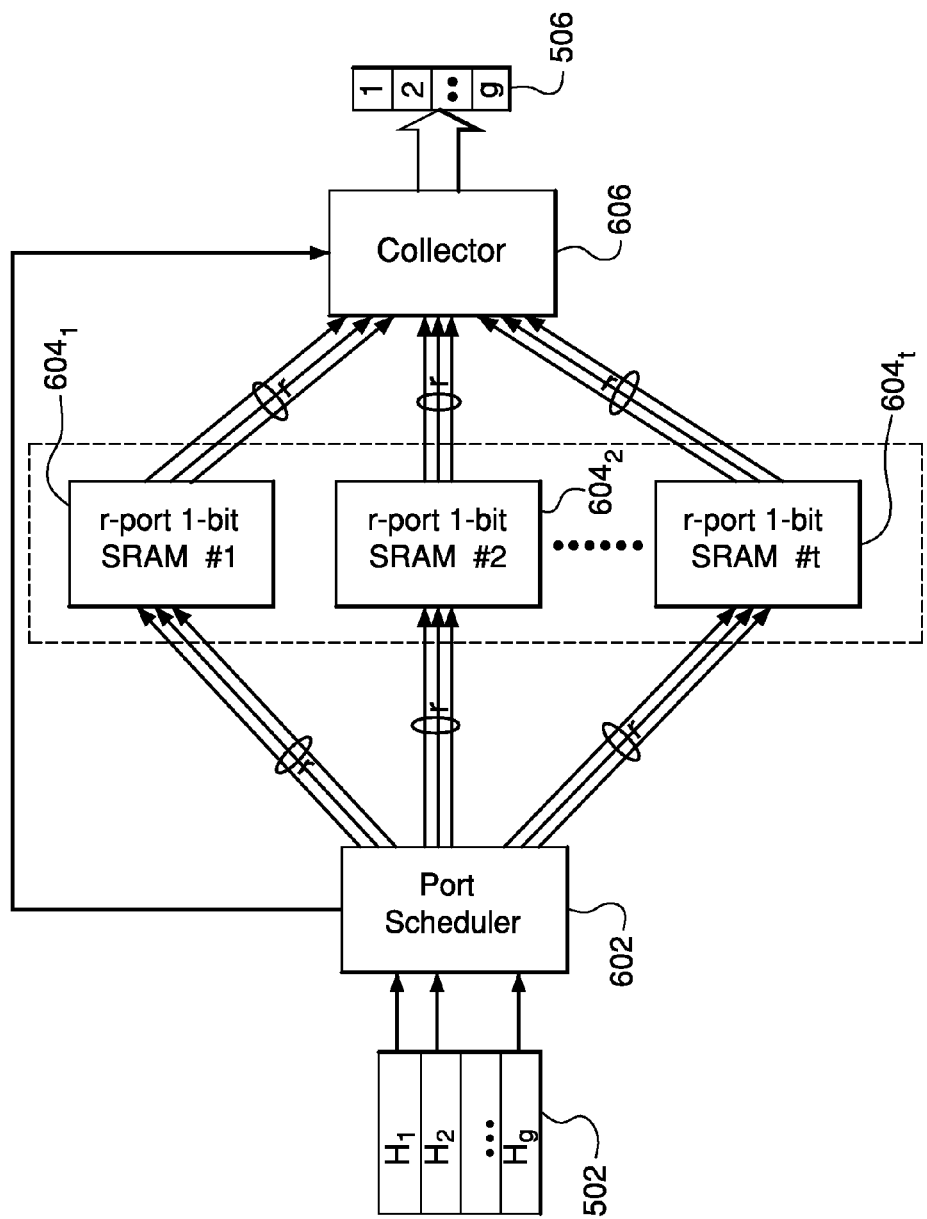
FIG. 6 shows a more-detailed block diagram of the insert of FIG. 5, according to one embodiment of the present invention.

FIG. 6 shows a more-detailed block diagram of insert 510 of FIG. 5, according to one embodiment of the present invention. Although insert 510 of FIG. 5 corresponds to hash function set $502_k$, Bloom sub-filter $504_k$, and pre-match vector $506_k$, since each corresponding grouping in FIG. 5 is implemented in a similar manner, elements in FIG. 6 are labeled without the subscript k.

In general, when processing a given IP destination address 352, system 300 can hash all g candidate prefix values corresponding to address 352 in parallel using the architecture of FIG. 5. This means that each Bloom sub-filter 504 of FIG. 5 needs to be accessed using the g different address values generated by the g different hash functions in the corresponding set 502. Since it may be impractical to implement Bloom sub-filter 504 using a g-port memory device, as shown in FIG. 6, Bloom sub-filter 504 is implemented using t different r-port SRAM devices 604, where $t \times r \geq g$, and r is some practical value, such as 2. Note that each different r-port SRAM device 604 stores 1-bit values for a different range of addresses in Bloom sub-filter 504, where each value generated by a hash function comprises two parts: an SRAM block ID identifying the particular SRAM device 604 and a bucket address in the identified SRAM device.

In addition, since more than r different address values of the g address values may correspond to a single r-port SRAM device 604, those more-than-r different address values cannot be processed at the same time. As such, Bloom sub-filter 504 is also implemented with port scheduler 602, which controls the sequence and timing of the g different table lookups using the g different address values, and collector 606, which controls the setting of bits in g-bit pre-match vector 506 based on the data retrieved during those g different table lookups. One goal of port scheduler 602 is to maximize the number of SRAM devices and ports used in one cycle. In the worst case where all g address values point to the same SRAM device 604, g/r cycles are needed. Port scheduler 602 is described in further detail later in this specification in the section entitled "Bloom Sub-Filter Memory Port Scheduling."

By implementing Bloom filter 301 of FIG. 3 using Bloom sub-filters 504 of FIG. 5, and each Bloom sub-filter 504 using the architecture of FIG. 6, Bloom filter 301 is scalable on line speed, routing table size, and the number and sizes of prefix lengths. The hardware architecture of system 300 directly maps to state-of-the-art ASICs and FPGAs with reasonable resource consumption and will support non-stop line-speed forwarding in next-generation 100 G core routers.

In theory, it is possible to implement the architecture of the '832 publication using a single Bloom filter by expanding all of the prefixes in the routing table to a single prefix length corresponding to the largest prefix length in the routing table. For typical IP routing tables, this results in an unacceptably large routing table. One advantage of the architectures of both FIGS. 4 and 5 is that they achieve the advantages of having a single Bloom filter without having to expand any prefixes in the routing table, no matter how many different prefix lengths are represented in the routing table, and no matter what the distribution is of prefix values over those different prefix lengths.

In the architecture of FIG. 2, for an asymmetric routing table, in order to keep the false-positive probability level relatively constant for the different prefix lengths, different Bloom filters 101 need to be hashed using different numbers of hash functions. In the architectures of FIGS. 4 and 5, on the other hand, each Bloom sub-filter 504 is hashed using the same number (i.e., k in FIG. 4 and g in FIG. 5) of hash functions. This balanced loading is advantageous for a regular and modular implementation.

Ad-Hoc Prefix Expansion

One major argument against the use of Bloom filters for IP lookup is its traditional poor worst-case performance when packets come at the highest possible rate and all the candidate prefixes hash to false positives. Although this circumstance is highly unlikely to actually happen in the probability sense, we have to address this issue properly to comply with the strictest system-design requirements.

Note that, if a packet has a particular destination IP address having multiple candidate prefixes of different lengths that hash to false positives, each subsequent packet with a destination IP address having the same candidate prefixes will hash to the same false positives. Unless a longer candidate prefix corresponds to a true positive, the presence of multiple false-positive candidate prefixes slows down the packet lookup rate and might eventually overflow the elastic internal packet buffer so as to cause packet drops. On the other hand, infrequent and sparse false positives can be absorbed by the packet buffer if the average packet lookup speed exceeds the packet arrival rate. The following design scheme can reduce consecutive false positives regardless of the packet arrival pattern.

The design reserves some margin to tolerate a few false positives. For example, for a 400 MHz clock rate, the lookup budget is 400M/150M=2.7 cycles for the maximum packet rate that can be seen on a 100 GbE port, which means that there are 1.7 cycles per packet to deal with Bloom filter false positives in the worst case.

If a particular packet suffers from an excess number of false positives, to prevent the subsequent packets from the same flow from throttling the search engine, a scheme called ad-hoc prefix expansion is applied by block 312 of FIG. 3. When a packet causes trouble and the longest false-positive match is of length k, we extract the k-bit prefix of the packet's destination IP address and insert it into prefix table 303 along with the next-hop information. For example, if only two false-positive matches are allowed, but a packet with address 192.168.11.4 suffers three false-positive matches and the first (and also the longest) false-positive match happens at length of 24, then, to cope with this bad case, we insert a new "expanded" prefix 192.168.11.0/24 into the prefix table. This new prefix is associated with the same next-hop information as the real matching prefix. Any subsequent packets from the same flow will then be guaranteed to find the correct next-hop information in just one Bloom Filter access.

This scheme has (at least) three advantages. First, unlike prefix expansion for the architecture of FIG. 1, which is pre-determined and can exponentially increase the routing table size, the ad-hoc prefix-expansion scheme is active only when absolutely necessary and generates just one new prefix. Second, on-chip Bloom filter 301 remains intact. The new prefix needs to be inserted only into off-chip prefix table 303; the new prefix does not change the load of Bloom filter 301 nor does the new prefix affect the false-positive probability of Bloom filter 301. Third, the actual false-positive rate observed is not a function of arriving packets but rather is a function of the unique flows (i.e., unique destination IP addresses). When no new flows are seen, there are also no more false-positives.

The entire ad-hoc prefix-expansion process can be managed by system software implementing ad-hoc prefix updates block 312 of FIG. 3. An expanded prefix can be revoked at any time if it is no longer necessary. The scheme significantly reduces the overall routing-table size, simplifies the work load of incremental updates, and supports faster IP lookups.

If a large number of expanded prefixes results in a significant performance degradation of off-chip prefix table 303, reprogramming Bloom sub-filters 504 using the current set of prefixes (excluding the expanded ones) will help reset the state. However, due to the small Bloom-filter false-positive probability and the limited number of flows that are typically observed in a router, this rarely needs to be done.

Off-Chip Prefix Table

As described previously, after on-chip Bloom filter 301 has been searched, off-chip prefix table 303 also needs to be searched to verify the matching and to fetch the next-hop information. Off-chip prefix table 303 is typically organized as a hash table. Unbounded hash collisions (e.g., where two or more different candidate prefix values hash to the same address in prefix table 303) can cause serious performance degradation for prefix table 303.

Thanks to advances in SRAM technology, fast hash-table lookups can be achieved by taking full advantage of the abundant memory bandwidth. Instead of using linked lists to handle hash collisions, multiple colliding prefixes can be stored in individual hash buckets as long as the prefixes can be retrieved by one memory access.

500+ MHz QDR-III SRAM devices support 72-bit read and write operations per clock cycle. A burst read access using two clock cycles can retrieve 144 bits, which are enough to pack three IPv4 prefixes or two IPv6 prefixes plus the next-hop information. With a 144-bit bucket size, a 72-Mbit memory contains 500K buckets, which are capable of holding 1.5 million IPv4 prefixes or one million IPv6 prefixes.

Another problem is how to avoid bucket overflow or at least minimize its occurrence. Hash tables suitable for prefix table 303 are the Fast Hash Table described by H. Song, S. Dharmapurikar, J. S. Turner, and J. W. Lockwood, "Fast Hast Table Lookup using Extended Bloom Filter: An Aid to Network Processing," *ACM SIGCOMM,* 2005, and the Peacock Hash Table described by S. Kumar, J. Turner, and P. Crowley, "Peacock Hash: Fast and Updatable Hashing for High Performance Packet Processing Algorithms," *IEEE INFOCOM,* 2008, the teachings of both of which are incorporated herein by reference in their entirety.

A. Broder and M. Mitzenmacher, "Using Multiple Hash Functions to Improve IP Lookups," *IEEE INFOCOM,* 2001, the teachings of which are incorporated herein by reference in its entirety, describe a scheme to simplify the design of the Fast and Peacock Hash Tables. According to this scheme, each prefix in the routing table is hashed using two hash functions, and the prefix is then stored in the lighter-loaded bucket. As a result, each prefix lookup needs to access prefix table 303 two times using the two hash functions, and all the prefixes stored in the two accessed buckets need to be compared to find the match.

Although each prefix has two bucket choices and each bucket can store 2 (IPv6) or 3 (IPv4) prefixes, bucket overflow can still happen. However, analysis and simulation show that the overflows are extremely rare, thanks to the powerful multi-hash scheme. When overflow prefixes do occur, they can be handled using a small on-chip CAM.

Since each lookup needs to access prefix table 303 two times and each memory access takes two clock cycles, a 500 MHz SRAM can support 125M lookups per second, which is a little short of the worst-case 150 Mpps lookup rate required by a 100 GbE line card. There are (at least) two ways to get around this problem. First, faster SRAM devices can be used. For example, a 600 MHz SRAM device can satisfy the worst-case requirement. Second, two 36- or 18-Mbit SRAM devices can be used in parallel, with each addressed by a different hash function. This scheme provides 250M lookups per second, way beyond the worst-case requirement, leaving more than 67% of memory bandwidth to deal with Bloom-filter false-positive matches. Note that this scheme doubles the memory bandwidth but does not increase the memory size.

Although the prefix table has been described in the context of two hash functions per prefix and two or three prefixes per table bucket, the invention can, in theory, be implemented using more than two hash functions per prefix and more than three prefixes per table buck.

Non-Stop Forwarding

The routing information is constantly updated to reflect the latest network condition. Routing processor 306 of FIG. 3, which runs the routing protocols, edits the new prefix/next-hop and updates the routing table data structure on line cards accordingly.

While updating, it is not allowed to interrupt the forwarding service nor generate wrong next-hops. Updating is achieved by first inserting or deleting the prefix from off-chip prefix table 303, then appropriately modifying on-chip Bloom sub-filters 504. This can guarantee error-free updates. For a prefix update, there is at most one memory access to each Bloom sub-filter 504, and all the memory accesses can be conducted in parallel, so the impact to the system throughput is minimized. Off-chip prefix table 303 is stored in QDR SRAM, where a separate writing port is dedicated for table updates.

Exemplary Implementations

Exemplary implementations of system 300 of FIG. 3 use 8-Mbit on-chip SRAMs to implement 16 Bloom sub-filters 504. Each Bloom sub-filter 504 is further implemented with 32 or 64 two-port SRAM blocks 604 for a total of 512 or 1024 blocks. Each block is 16-Kbit or 8-Kbit in size, configured as a 1-bit array. Such a design is feasible in FPGA devices such as Altera's Stratix IV FPGA, which has more than 22 Mb of embedded memory including 1280 9-Kbit modules. One or two 9-Kbit modules can be combined to form each memory block 604. With this configuration, each prefix is hashed 16 times, with a maximum of 16×48=768 hash functions for IPv6 and 16×24=384 hash functions for IPv4. For 250K prefixes, a false-positive probability can be achieved as low as $3.3 \times 10^{-7}$. When ad-hoc prefix expansion is applied, this means that there are typically fewer than four expanded prefixes for every 10 million flows.

Of course, other implementations based on other numbers, sizes, and/or speeds of these various elements are also possible.

Hash Functions for Bloom Filter

Although system 300 can be implemented using any suitable hash functions for hashing candidate prefix values into address values for Bloom filter 301, system 300 is preferably implemented using hash functions based on an area-efficient hash scheme that can produce n hash values using just $O(\lg_2 n)$ seed hash functions for a single hash key (in this case, a single candidate prefix value). Since the hash operations use relatively simple logic operations, they are fast enough for time-critical applications.

Given a given candidate prefix value, n hash values $H_1, \ldots, H_n$ can be generated using only m universal seed hash functions $S_1, \ldots, S_m$, as if n different hash functions were actually used, where m is given by Equation (2) as follows:

$$m = \begin{cases} lg_2 n + 1 & n = 2^k, k \in N \\ \lceil lg_2 n \rceil & n \neq 2^k, k \in N \end{cases} \quad (2)$$

where N is the set of all integers, and each universal seed hash function $S_i$ generates an address between 0 and t−1, where t is an integer power of 2 (i.e., the hash result can be represented as a bit-vector with $\lg_2 t$ bits).

The construction of each hash value $H_i$, where $i \in \{1,n\}$, is as follows. For each value of i, there is a unique representation of i, as given by Equation (3) as follows:

$$i = r_m \times 2^{m-1} + r_{m-1} \times 2^{m-2} + \ldots + r_2 \times 2 + r_1 \forall r_i \in \{0,1\}. \quad (3)$$

The corresponding hash value $H_i$ is defined according to Equation (4) as follows:

$$H_i = (r_m \times S_m) \oplus (r_{m-1} \times S_{m-1}) \oplus \ldots \oplus (r_1 \times S_1), \quad (4)$$

where $\oplus$ is a bit-wise XOR operation. $H_i$ has the exact same address space as $S_i$.

The following example of Equation (5) uses three seed hash functions $S_1$, $S_2$, and $S_3$ to produce seven hash values $H_1$-$H_7$:

$H_1 = S_1$ $H_2 = S_2$ $H_3 = S_2 \oplus S_1$ $H_4 = S_3$ $H_5 = S_3 \oplus S_1$ $H_6 = S_3 \oplus S_2$ $H_7 = S_3 \oplus S_2 \oplus S_1$ This scheme can be extended, for example, to use four seed hash functions to generate 15 hash values. Note that the 16 hash values for each prefix length in the exemplary implementations described in the previous section, can be implemented using four seed hash functions (to generate 15 hash values) plus one additional hash function (to generate the 16$^{th}$ hash value). This results in a 69% reduction in hardware resource usage compared to having to implement 16 different hash functions. The scheme can also be implemented in software, where it can significantly boost the hash calculation speed.

In general, under this scheme, m seed hash functions can be used to generate up to $2^m-1$ total hash values, of which m hash values may be said to be seed hash values generated by m seed hash function elements applying them seed hash functions to a candidate prefix value (as in $H_1$, $H_2$, and $H_4$ above) and the remaining $2^m-m-1$ hash values may be said to be additional hash values generated by $2^m-m-1$ seed hash value combiners combining two or more of the seed hash values in different ways (as in $H_3$, $H_5$, $H_6$, and $H_7$ above). Note that both the seed hash values and the additional hash values can be derived using Equation (4). In the case of seed hash values, all coefficients $r_i$ are zero, except for one coefficient, which is one Jul. 21, 2008

For $2^m-1$ total hash values, m is the minimum number of seed hash functions needed to generate the desired total number of hash values. Of course, more than m seed hash functions can always be used to generate that same number of total hash values by selecting only a subset of different possible combinations of seed hash values.

Note that any suitable (e.g., fast) hash functions can be used as the seed hash functions, such as the hash functions proposed by M. Ramakrishna, E. Fu, and E. Bahcekapili, "A Performance Study of Hashing Functions for Hardware Applications," *Proc. 6th Int'l. Conf. Computing and Information*, 1994, the teachings of which are incorporated herein by reference in its entirety.

Although the hash function scheme described in this section is described in the context of the network address lookup architecture of FIG. 3, the scheme can be applied to other network address lookup architectures, such as that of FIG. 1. In addition, the scheme can be applied to hash-based applications other than network address lookup, such as packet classification, deep packet inspection (DPI), traffic statistics, and flow monitoring. In general, the scheme can be applied in any suitable situation where a relatively large number of hash functions is applied to a set of items, for example, in database applications.

Bloom Sub-Filter Memory Port Scheduling

The function of port scheduler 602 of FIG. 6 mapping the 24 or 48 Bloom sub-filter read requests to different memory blocks 604 turns out to be the most resource-consuming part of the design. For two-port memory blocks, when more than two read requests target to the same memory block, more than one clock cycle is needed to schedule these requests. This can significantly increase design complexity and negatively impact the system throughput. In one possible implementation, only one clock cycle is used to schedule the requests. When more than two requests are for a particular memory block, only the two requests for the top two longest prefixes are granted. The remaining requests are simply skipped. However, the skipped requests are treated as if they all found matches, which are possibly false. The corresponding bits in the corresponding pre-match vector 506 are thus directly set to one without actually performing the lookup.

Note that, in the exemplary implementations described previously, there are 16 Bloom sub-filters 504 working in parallel, and each prefix length generates one read request in each different Bloom sub-filter using a different hash function. As such, even if a request for a prefix length is skipped in one Bloom sub-filter, the requests in the other 15 Bloom sub-filters are likely to be granted, so the effect is that, for a given prefix length, a reduced number of hash functions are used to search Bloom filter 301. Although the false-positive rate is not as low as that when all the hash functions are used, this slightly higher false-positive rate is traded off for a smaller and faster implementation. In addition, since port scheduler 602 shows preference to longer prefixes, the longer the prefix is, the more memory accesses are actually performed, and, as such, a better false-positive probability is achieved.

Broadening

As described above, the present invention may be used to implement IP lookups for IP routing tables, such as IPv4 or IPv6 routing tables. More generally, the present invention can be used to implement network address lookups for routing tables for any suitable networks.

Although the present invention has been described in the context of an on-chip Bloom filter and an off-chip prefix table, the invention can, in theory, also be implemented with an off-chip Bloom filter and/or an on-chip prefix table.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for performing a network address lookup for a routing table having prefixes of a plurality of different prefix lengths, the method comprising:
   (a) providing a Bloom filter programmed with the prefixes corresponding to all of the different prefix lengths in the routing table without having to expand any of the prefixes programmed into the Bloom filter; and
   (b) performing membership probes into the Bloom filter using candidate prefix values for a given network address, wherein:
      there are g different prefix lengths in the routing table and g candidate prefix values for each given network address;
      the Bloom filter is programmed by hashing each prefix in the routing table into k hash values corresponding to k hash functions
      the Bloom filter is implemented using k Bloom sub-filters;
      each Bloom sub-filter is associated with a different set of g hash functions; and
      each hash value in a set is associated with a different prefix length.

2. The method of claim 1, wherein step (b) comprises hashing each of the g candidate prefix values of the given network address into a set of k hash values for the Bloom filter.

3. The method of claim 1, wherein the g candidate prefix values of the given network address are hashed into the k Bloom sub-filters in parallel.

4. The method of claim 1, wherein:
   each different Bloom sub-filter is associated with a different pre-match vector; and
   step (b) comprises, for each candidate prefix value:
      (b1) hashing the candidate prefix value into a single hash value corresponding to a single hash function in each set to generate a corresponding bit value in a corresponding one of the k pre-match vectors; and
      (b2) applying a logical AND function to corresponding bits in the k pre-match vectors to generate a corresponding bit in a match vector for the Bloom filter.

5. The method of claim 1, wherein each Bloom sub-filter is implemented using t r-port memory devices, wherein t×r≧g.

6. The method of claim 5, wherein, for each Bloom sub-filter, step (b) comprises:
   (b1) processing g table lookup requests into the t r-port memory devices; and
   (b2) collecting processing results for the g table lookup requests to generate corresponding bits of a pre-match vector.

7. The method of claim 6, wherein, if there are more than r table lookup requests for a single r-port memory device for the given network address, then:
   step (b1) comprises performing r table lookups corresponding to the r longest prefixes of the more-than-r table lookup requests and skipping the other table lookup requests; and
   step (b2) comprises treating the other table lookup requests as if they returned positive matches when generating the corresponding bits of the pre-match vector.

8. The method of claim 1, further comprising:
   (c) accessing a prefix table based on one or more matching candidate prefix values identified in step (b).

9. The method of claim 8, wherein, if at least a specified number of longest, matching candidate prefix values identified in step (b) are determined to be false-positive matches in step (c), then step (c) further comprises adding the longest, false-positive matching candidate prefix value to the prefix table along with true next-hop information for the given network address.

10. The method of claim 8, wherein at least one bucket in the prefix table identifies two or more different prefix values, such that the two or more different prefix values are retrieved in one prefix table lookup.

11. The method of claim 8, wherein the prefix table is hashed using two or more hash functions per candidate prefix value.

12. The method of claim 1, wherein step (b) comprises:
   (b1) hashing each candidate prefix value using a set of seed hash functions to generate a set of seed hash values for the candidate prefix value; and
   (b2) combining two or more of the seed hash values one or more different ways to generate one or more additional hash values for the candidate prefix value.

13. The method of claim 12, wherein step (b2) comprises applying a bit-wise XOR function to the two or more seed hash values to generate each additional hash value.

14. The method of claim 1, wherein:
   the g candidate prefix values of the given network address are hashed into the k Bloom sub-filters in parallel;
   each different Bloom sub-filter is associated with a different pre-match vector;
   step (b) comprises, for each candidate prefix value:
      (b1) hashing the candidate prefix value into a single hash value corresponding to a single hash function in each set to generate a corresponding bit value in a corresponding one of the k pre-match vectors, wherein:
         the candidate prefix value is hashed using a set of seed hash functions to generate a set of seed hash values for the candidate prefix value; and
         two or more of the seed hash values are combined by applying a bit-wise XOR function in one or more different ways to generate one or more additional hash values for the candidate prefix value; and
      (b2) applying a logical AND function to corresponding bits in the k pre-match vectors to generate a corresponding bit in a match vector for the Bloom filter;
   each Bloom sub-filter is implemented using t r-port memory devices, wherein t×r≧g;

for each Bloom sub-filter, step (b1) comprises:
- (b1i) processing g table lookup requests into the t r-port memory devices; and
- (b1ii) collecting processing results for the g table lookup requests to generate corresponding bits of the pre-match vector;

if there are more than r table lookup requests for a single r-port memory device for the given network address, then:
- step (b1i) comprises performing r table lookups corresponding to the r longest prefixes of the more-than-r table lookup requests and skipping the other table lookup requests; and
- step (b1ii) comprises treating the other table lookup requests as if they returned positive matches when generating the corresponding bits of the pre-match vector;

further comprising (c) accessing a prefix table based on one or more matching candidate prefix values identified in step (b);

if at least a specified number of longest, matching candidate prefix values identified in step (b) are determined to be false-positive matches in step (c), then step (c) further comprises adding the longest, false-positive matching candidate prefix value to the prefix table along with true next-hop information for the given network address;

at least one bucket in the prefix table identifies two or more different prefix values, such that the two or more different prefix values are retrieved in one prefix table lookup; and the prefix table is hashed using two or more hash functions per candidate prefix value.

15. An apparatus for performing a network address lookup for a routing table having prefixes of a plurality of different prefix lengths, the apparatus comprising:
- a Bloom filter adapted to be programmed with the prefixes corresponding to all of the different prefix lengths in the routing table without having to expand any of the prefixes programmed into the Bloom filter; and
- a routing processor adapted to perform membership probes into the Bloom filter using candidate prefix values for a given network address, wherein:
  - there are g different prefix lengths in the routing table and g candidate prefix values for each given network address;
  - the Bloom filter is programmed by hashing each prefix in the routing table into k hash values corresponding to k hash functions;
  - the Bloom filter is implemented using k Bloom sub-filters;
  - each Bloom sub-filter is associated with a different set of g hash functions; and
  - each hash value in a set is associated with a different prefix length.

16. The apparatus of claim 15, wherein the Bloom filter and the routing processor are implemented on a single chip.

17. The apparatus of claim 15, wherein the apparatus is adapted to hash the g candidate prefix values of the given network address into the k Bloom sub-filters in parallel.

18. The apparatus of claim 15, wherein:
- each different Bloom sub-filter is associated with a different pre-match vector; and
- for each candidate prefix value, the apparatus is adapted to:
  - (1) hash the candidate prefix value into a single hash value corresponding to a single hash function in each set to generate a corresponding bit value in a corresponding one of the k pre-match vectors; and
  - (2) apply a logical AND function to corresponding bits in the k pre-match vectors to generate a corresponding bit in a match vector for the Bloom filter.

19. The apparatus of claim 15, wherein each Bloom sub-filter is implemented using:
- t r-port memory devices, wherein t×r≧g;
- a port scheduler adapted to process g table lookup requests into the t r-port memory devices; and
- a collector adapted to collect processing results for the g table lookup requests to generate corresponding bits of a pre-match vector.

20. The apparatus of claim 19, wherein, if there are more than r table lookup requests for a single r-port memory device for the given network address, then:
- the port scheduler performs r table lookups corresponding to the r longest prefixes of the more-than-r table lookup requests and skips the other table lookup requests; and
- the collector treats the other table lookup requests as if they returned positive matches when generating the corresponding bits of the pre-match vector.

21. The apparatus of claim 15, wherein the apparatus is operably coupled to a prefix table that is accessed by the apparatus based on one or more matching candidate prefix values identified during the membership probes.

22. The apparatus of claim 21, wherein, if at least a specified number of longest, matching candidate prefix values are determined to be false-positive matches, then the apparatus adds the longest, false-positive matching candidate prefix value to the prefix table along with true next-hop information for the given network address.

23. The apparatus of claim 21, wherein:
- at least one bucket in the prefix table identifies two or more different prefix values, such that the two or more different prefix values are retrieved in one prefix table lookup by the apparatus; and
- the apparatus is adapted to hash into the prefix table using two or more hash functions per candidate prefix value.

24. The apparatus of claim 15, wherein the apparatus is adapted to:
- (1) hash each candidate prefix value using a set of seed hash functions to generate a set of seed hash values for the candidate prefix value; and
- (2) combine two or more of the seed hash values one or more different ways to generate one or more additional hash values for the candidate prefix value.

25. The apparatus of claim 24, wherein the apparatus is adapted to generate each additional hash value by applying a bit-wise XOR function to the two or more seed hash values.

26. A method for performing a network address lookup for a routing table having prefixes of a plurality of different prefix lengths, the method comprising:
- (a) providing a Bloom filter programmed with the prefixes corresponding to all of the different prefix lengths in the routing table without having to expand any of the prefixes programmed into the Bloom filter;
- (b) performing membership probes into the Bloom filter using candidate prefix values for a given network address;
- (c) accessing a prefix table based on one or more matching candidate prefix values identified in step (b), wherein, if at least a specified number of longest, matching candidate prefix values identified in step (b) are determined to be false-positive matches in step (c), then step (c) further comprises adding the longest, false-positive matching candidate prefix value to the prefix table along with true next-hop information for the given network address.

27. A method for performing a network address lookup for a routing table having prefixes of a plurality of different prefix lengths, the method comprising:
- (a) providing a Bloom filter programmed with the prefixes corresponding to all of the different prefix lengths in the routing table without having to expand any of the prefixes programmed into the Bloom filter;
- (b) performing membership probes into the Bloom filter using candidate prefix values for a given network address;
- (c) accessing a prefix table based on one or more matching candidate prefix values identified in step (b), wherein at least one bucket in the prefix table identifies two or more different prefix values, such that the two or more different prefix values are retrieved in one prefix table lookup.

28. A method for performing a network address lookup for a routing table having prefixes of a plurality of different prefix lengths, the method comprising:
- (a) providing a Bloom filter programmed with the prefixes corresponding to all of the different prefix lengths in the routing table without having to expand any of the prefixes programmed into the Bloom filter;
- (b) performing membership probes into the Bloom filter using candidate prefix values for a given network address; and
- (c) accessing a prefix table based on one or more matching candidate prefix values identified in step (b), wherein the prefix table is hashed using two or more hash functions per candidate prefix value.

29. A method for performing a network address lookup for a routing table having prefixes of a plurality of different prefix lengths, the method comprising:
- (a) providing a Bloom filter programmed with the prefixes corresponding to all of the different prefix lengths in the routing table without having to expand any of the prefixes programmed into the Bloom filter; and
- (b) performing membership probes into the Bloom filter using candidate prefix values for a given network address, wherein step (b) comprises:
  - (b1) hashing each candidate prefix value using a set of seed hash functions to generate a set of seed hash values for the candidate prefix value; and
  - (b2) combining two or more of the seed hash values one or more different ways to generate one or more additional hash values for the candidate prefix value.

30. The method of claim 29, wherein step (b2) comprises applying a bit-wise XOR function to the two or more seed hash values to generate each additional hash value.

31. An apparatus for performing a network address lookup for a routing table having prefixes of a plurality of different prefix lengths, the apparatus comprising:
- a Bloom filter adapted to be programmed with the prefixes corresponding to all of the different prefix lengths in the routing table without having to expand any of the prefixes programmed into the Bloom filter; and
- a routing processor adapted to perform membership probes into the Bloom filter using candidate prefix values for a given network address, wherein:
  - the apparatus is operably coupled to a prefix table that is accessed by the apparatus based on one or more matching candidate prefix values identified during the membership probes; and
  - if at least a specified number of longest, matching candidate prefix values are determined to be false-positive matches, then the apparatus adds the longest, false-positive matching candidate prefix value to the prefix table along with true next-hop information for the given network address.

32. An apparatus for performing a network address lookup for a routing table having prefixes of a plurality of different prefix lengths, the apparatus comprising:
- a Bloom filter adapted to be programmed with the prefixes corresponding to all of the different prefix lengths in the routing table without having to expand any of the prefixes programmed into the Bloom filter; and
- a routing processor adapted to perform membership probes into the Bloom filter using candidate prefix values for a given network address, wherein:
  - the apparatus is operably coupled to a prefix table that is accessed by the apparatus based on one or more matching candidate prefix values identified during the membership probes;
  - at least one bucket in the prefix table identifies two or more different prefix values, such that the two or more different prefix values are retrieved in one prefix table lookup by the apparatus; and
  - the apparatus is adapted to hash into the prefix table using two or more hash functions per candidate prefix value.

33. An apparatus for performing a network address lookup for a routing table having prefixes of a plurality of different prefix lengths, the apparatus comprising:
- a Bloom filter adapted to be programmed with the prefixes corresponding to all of the different prefix lengths in the routing table without having to expand any of the prefixes programmed into the Bloom filter; and
- a routing processor adapted to perform membership probes into the Bloom filter using candidate prefix values for a given network address, wherein the apparatus is adapted to:
  - (1) hash each candidate prefix value using a set of seed hash functions to generate a set of seed hash values for the candidate prefix value; and
  - (2) combine two or more of the seed hash values one or more different ways to generate one or more additional hash values for the candidate prefix value.

34. The apparatus of claim 33, wherein the apparatus is adapted to generate each additional hash value by applying a bit-wise XOR function to the two or more seed hash values.

* * * * *